United States Patent [19]
Bainachi et al.

[11] Patent Number: 5,700,011
[45] Date of Patent: Dec. 23, 1997

[54] SEALING UNIT WITH AXIAL BRUSHES CONTROLLED BY STATIC PRESSURE IN AXIAL MOVEMENT

[75] Inventors: Daniel Olivier Bainachi, Avon; Guy Franck Paul Dusserre-Telmon, Sivry Courtry; Daniel Georges Plona, Vulaines sur Seine, all of France

[73] Assignee: Societe Nationale d'Etude et de Construction de Moteurs d'Aviation "Snecma", Paris, France

[21] Appl. No.: 738,908

[22] Filed: Oct. 28, 1996

[30] Foreign Application Priority Data

Nov. 15, 1995 [FR] France .................. 95.13507

[51] Int. Cl.$^6$ .................................................. F16J 15/38
[52] U.S. Cl. ........................................ 277/65; 277/83
[58] Field of Search ........................ 277/65, 83, 38, 277/59, 81 R, 85, 91, 95, 82

[56] References Cited

U.S. PATENT DOCUMENTS

| | | | |
|---|---|---|---|
| 3,033,579 | 5/1962 | Seaver | 277/65 |
| 3,260,530 | 7/1966 | Jelatis et al. | 277/65 |
| 4,071,253 | 1/1978 | Heinen et al. | 277/65 |
| 4,434,986 | 3/1984 | Warner | 277/65 |
| 4,669,735 | 6/1987 | Sundberg et al. | |
| 4,813,689 | 3/1989 | Stalter et al. | 277/65 |
| 5,000,463 | 3/1991 | Sun | |
| 5,058,905 | 10/1991 | Nosowicz et al. | 277/65 |
| 5,203,575 | 4/1993 | Azibert et al. | 277/65 |
| 5,490,679 | 2/1996 | Borrino et al. | 277/65 |

FOREIGN PATENT DOCUMENTS 2 167 141  5/1986  United Kingdom.

*Primary Examiner*—Daniel G. DePumpo
*Attorney, Agent, or Firm*—Oblon, Spivak, McClelland, Maier & Neustadt, P.C.

[57] ABSTRACT

Sealing unit made up of a floating body placed between a stator and a rotor, axially mobile along the stator and carrying sealing joints between a high pressure area and a low pressure area separated by the rotor. Another pair of joints and by, by stopping against rotor when the latter is displaced axially, allows a resultant pressure force to be exerted which moves floating body in the same direction as the rotor to reach a position of balance in which the elastic joints operate in satisfactory manner without being subjected to excessive wear and without breaking the seal.

3 Claims, 1 Drawing Sheet

5,700,011

1

SEALING UNIT WITH AXIAL BRUSHES CONTROLLED BY STATIC PRESSURE IN AXIAL MOVEMENT

BACKGROUND OF THE INVENTION

1. Field of the Invention

This invention relates to a sealing unit placed between a stator and a self-rotating rotor plate which is surrounded by the stator.

2. Discussion of the Background

One conventional sealing means used in aeroplane engines consists of placing a labyrinth seal across the clearance between the stator and rotor. It is a device consisting of parallel, flat ridges, a called blades material positioned on the rotor and projecting towards the stator which rub against a layer of soft material—so-called abradable—which covers the stator and erodes in such manner that there remains only very little clearance with this layer.

Particular states of the motor may, however, produce exceptional differential thermal expansion which causes the blades to penetrate deeper into the abradable so that under subsequent normal conditions of use the clearance will become much greater. The conclusion must therefore be drawn that the advantage of this type of joint is compromised.

Other currently used joints for this function are elastic joints which comprise either elements such as brush pins fixed to one of the components of the assembly which rub against the other component, which bends them, or elements molded into rigid lips mounted by means of springs onto one of the components and pushed back against the other component by these springs.

These joints are satisfactory for numerous applications, but differential expansion in a radial direction between the rotors and stators under consideration is too great for these joints to be used under good conditions as the clearance to be filled varies to such extremes that in practice the clearance is either too excessive or on the contrary too small for the chosen joint which therefore losses its efficacy or wears prematurely according to the situation.

SUMMARY OF THE INVENTION

The invention is based on a new idea which nevertheless uses elastic joints to make a seal between the stator and rotor, but instead of placing them in the form of radially oriented flat sealing joints in accordance with known concepts so that they rub against the edge of the rotor plate, axially oriented cylindrical joints are used which rub against the peripheries of flat surfaces opposite the rotor. This arrangement is not sufficient in itself as differential thermal expansion also exerts itself in an axial direction, so that the same problems arise of wide variations in clearance.

It is therefore in accordance with the invention to have these elastic joints carried by a stator floating body, which is axially mobile in relation to the stator, which surrounds the rotor, and whose function is to follow the axial movements of the rotor to ensure good operating conditions for the elastic joints at all times.

A slightly more complicated arrangement is subsequently necessary and the invention therefore consists of a sealing unit placed between a stator and a rotor plate rotating around an axis, separating a high pressure sector from a low pressure sector, comprising a body that is fixed during rotation and mobile during translation in the stator depending upon the axis, characterized in that the body comprises two sides covering the peripheries of two surfaces of the plate which are opposite and each directed towards one of the sectors, and in that it comprises: two elastic sealing joints of cylindrical shape and with axial extension each compressed between one of the sides and one of the opposite surfaces; two stop gaskets of cylindrical shape and with an axial extension each lying between one of the sides and one of the opposite surfaces but which are shorter than the elastic joints; one of the stop gaskets surrounding one of the elastic joints towards the high pressure sector, and one of the elastic joints surrounding one of the stop gaskets towards the low pressure sector; and two alternate expansion sealing joints of a flat, circular shape placed between the stator and end parts of the sealing body each in one of the sectors, each with an outer diameter equivalent to the diameter of the elastic joint positioned towards the same sector.

An axially floating body whose purpose is to contribute towards making a seal between two sectors of different pressure in a gas turbine is illustrated in French patent 2018924, but its structure is different in that it includes a sliding body (60) which ends in two circular, concentric lips (74 and 76) which rest against a flat component (34) with which they have clearance. The chamber (80) thereof is bounded by the lips (74 and 76) and the flat component (84) receives a gas supply through an opening (82). When the supply flow rate varies, the pressure in the chamber also varies and the body (60) slides under the effect of the resulting pressure force to which it is subjected; it subsequently modifies the width of clearance and therefore the opening of the chamber (80) through which the gases can escape, which restores the required pressure within the chamber.

BRIEF DESCRIPTION OF THE DRAWINGS

The invention shall be described in more detail below using the figures appended as a guide which illustrate a non-restrictive embodiment of the invention.

DESCRIPTION OF THE PREFERRED EMBODIMENTS

Figure 1:
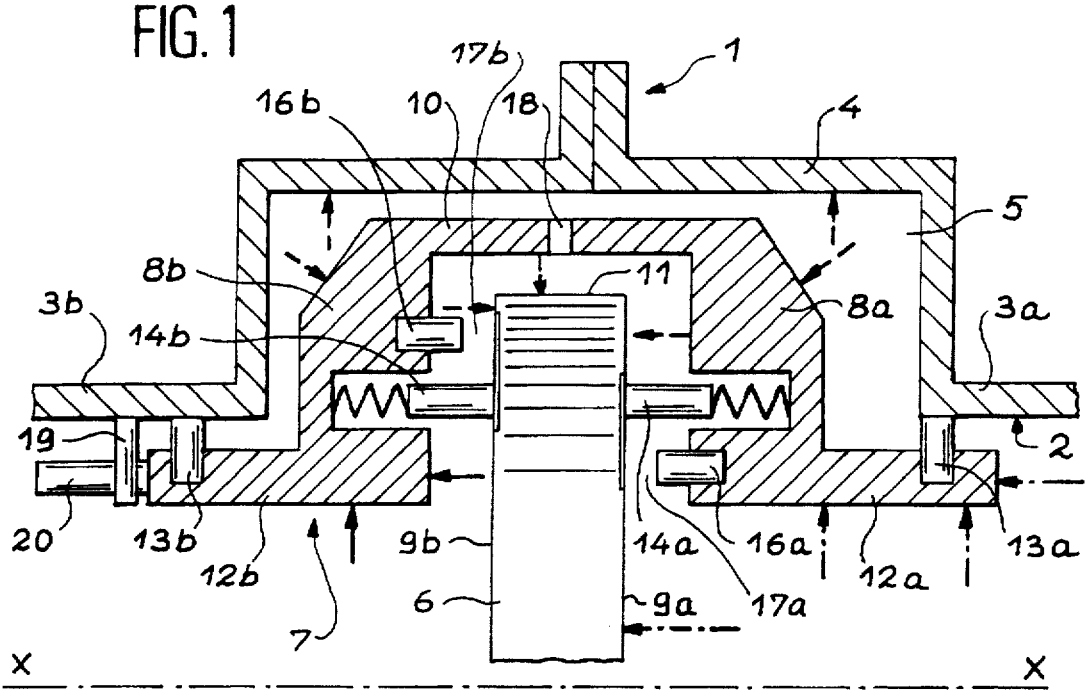
FIG. 1 represents partially in cross section the invention at rest.

The invention can therefore be used in a gas turbine between a stator 1 and a rotor 2 which are only partially represented. Stator 1 is essentially made up of a wall which, between two cylindrical surfaces 3a and 3b having the same diameter, has a recess 4 corresponding to a cylindrical portion of wider diameter. A peripheral chamber 5 is formed in recess 4. The essential component of rotor 2 here is a plate 6 rotating around an axis X—X concentric to parts 3a, 3b and 4 of stator 1 and which extends partly into peripheral chamber 5, its diameter being greater than that of the cylindrical surfaces 3a and 3b.

The part characterizing the invention is a stator floating body 7, in the shape of a collar surrounding the periphery of rotor plate 6. More precisely, its section is in the form of a cap divided into two symmetrical sides 8a and 8b, each covering one end of one of the flat, lateral, opposite surfaces 9a and 9b of rotor plate 6; a cylindrical intermediate section 10 which connects them together at their ends with the widest diameter, surrounding edge 11 of rotor plate 6 and extending exclusively into peripheral chamber 5; and two rim parts 12a and 12b starting from the opposite end of sides 8a and 8b, of smaller diameter, which diverge to enter into cylindrical surfaces 3a and 3b being concentric with the latter.

Rims 12a and 12b carry expansion joints 13a and 13b which rub precisely against cylindrical surfaces 3a and 3b in accordance with the sliding movements of floating body 7 along axis X; they provide support for floating body 7 by resting against cylindrical surfaces 3a and 3b and they contribute towards separating the volume of peripheral chamber 5 from the free parts a and b of the machine situated either side of rotor plate 6 of which the first is a low pressure area and the second a high pressure area.

Two elastic joints 14a and 14b are also used which may be brush joints made up of flexible pins or, as shown here, joints made up of a rigid sealing lip pushed back by a spring against the component, here rotor plate 6, against which they rub. Elastic joints 14a and 14b are fixed to floating body 7, for example by being inserted into grooves 15a and 15b of the, latter, in which the springs are fully recessed. They are cylindrical in shape and oriented axially and each have the same diameter which is more or less similar to the outer diameter of expansion joints 13a and 13b, or to the diameter of cylindrical surfaces 3a and 3b.

Finally two stop gaskets 16a and 16b can be seen, fixed in the same way as the two previous joints to the opposing surfaces of sides 8a and 8b and oriented towards rotor plate 6; they too are of cylindrical shape and have axial direction, but contrary to the previous joints, they do not extend as far as side surfaces 9a and 9b of rotor plate 6 but remain separated from these surfaces by a clearance 17a or 17b in the state of balance shown in FIG. 1. Another feature of these gaskets 16a and 16b is that they are not symmetrical; gasket 16a is situated on the low pressure side is surrounded by the corresponding elastic joint 14a, whereas the other stop gasket 16b has a wider diameter than the other elastic joint 14b and is located in peripheral chamber 5.

A locking pin 19 fixed to one of cylindrical surfaces 3b in between the two branches of a fork 20 extending beyond one of rims 12b prevents floating body 7 from rotating.

Peripheral chamber 5 considered for the functioning of the invention has its volume bounded by recess 4, the periphery of stator plate 6, rims 12a and 12b and expansion and elastic joints 13a and 13b, 14a and 14b. Its unity is maintained by a hole 18 made through the intermediate part 10 of floating body 7. The pressure in this chamber, exerting itself on its surfaces, is shown by arrows, and the pressures in areas a and b subject to high pressure and low pressure are shown by different types of arrows. A specialist in this art will note almost immediately that the forces exerted by these different pressures on the free surfaces of floating body 7 all cancel each other out in axial direction, mainly due to the choice of diameters of elastic joints 14a and 14b. As these elastic joints 14a and 14b are compressed in the same way by rotor plate 6, the balance is undisturbed and floating body 7 remains immobile; leaks may be observed through elastic joints 14a and 14b but they offset each other and the pressure remains unchanged in peripheral chamber 5.

Figure 2:
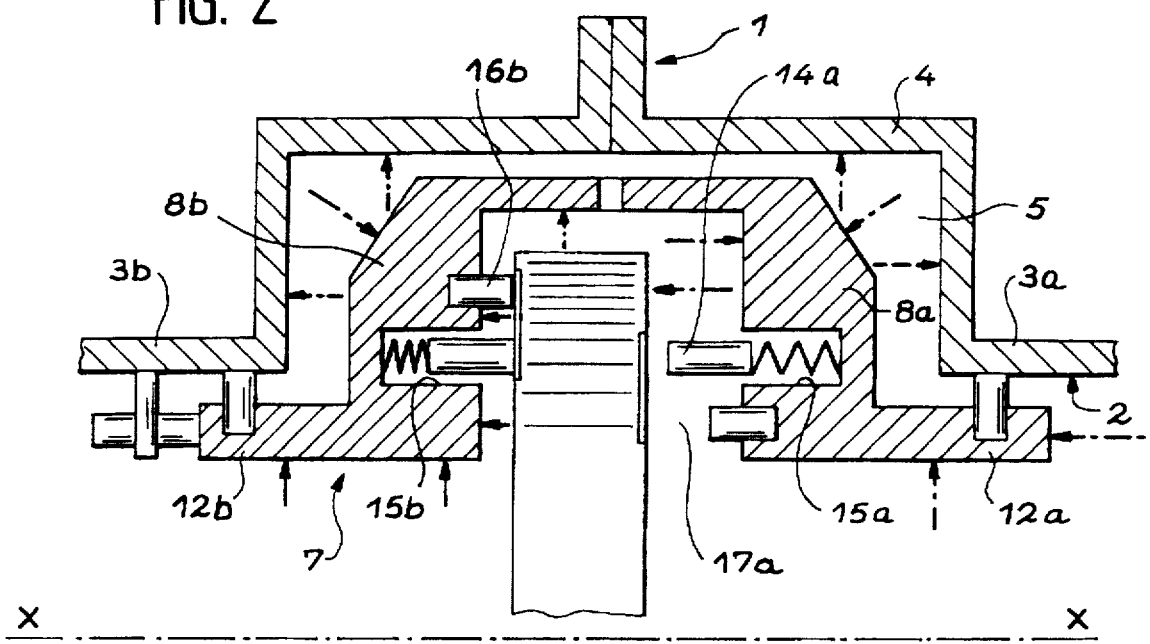
FIG. 2 represents partially in cross section the invention when this state of balance is disturbed.
Figure 1:
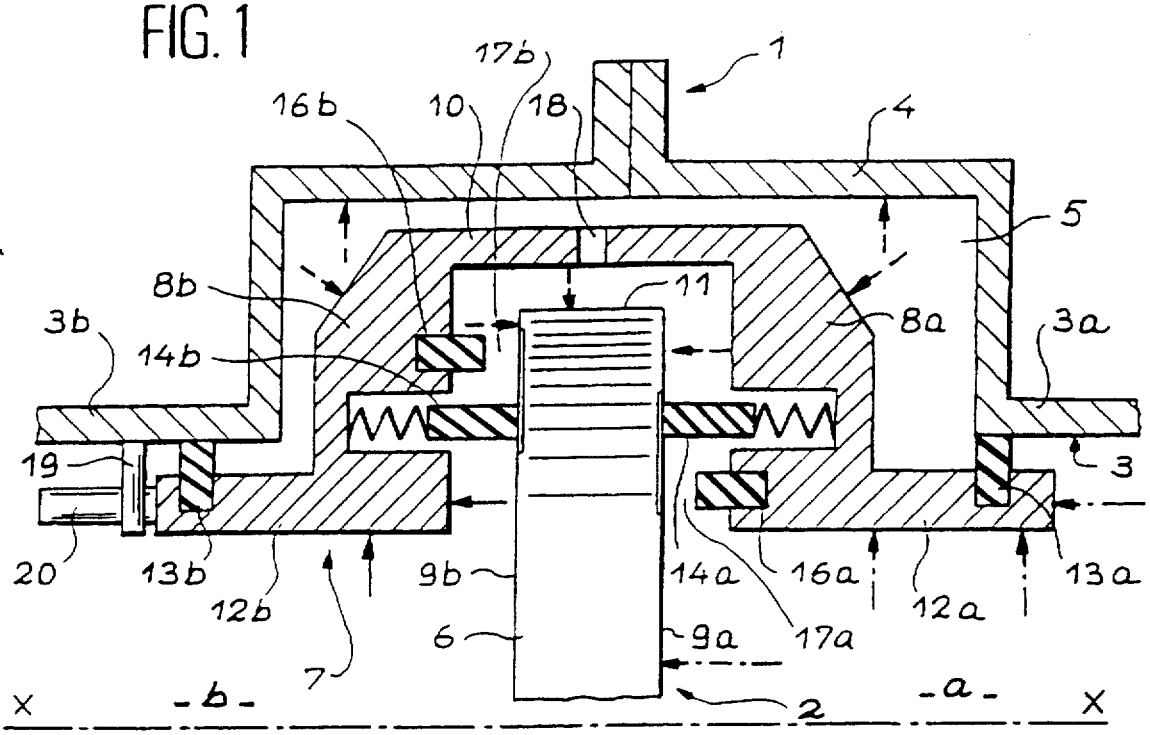
Figure 2:
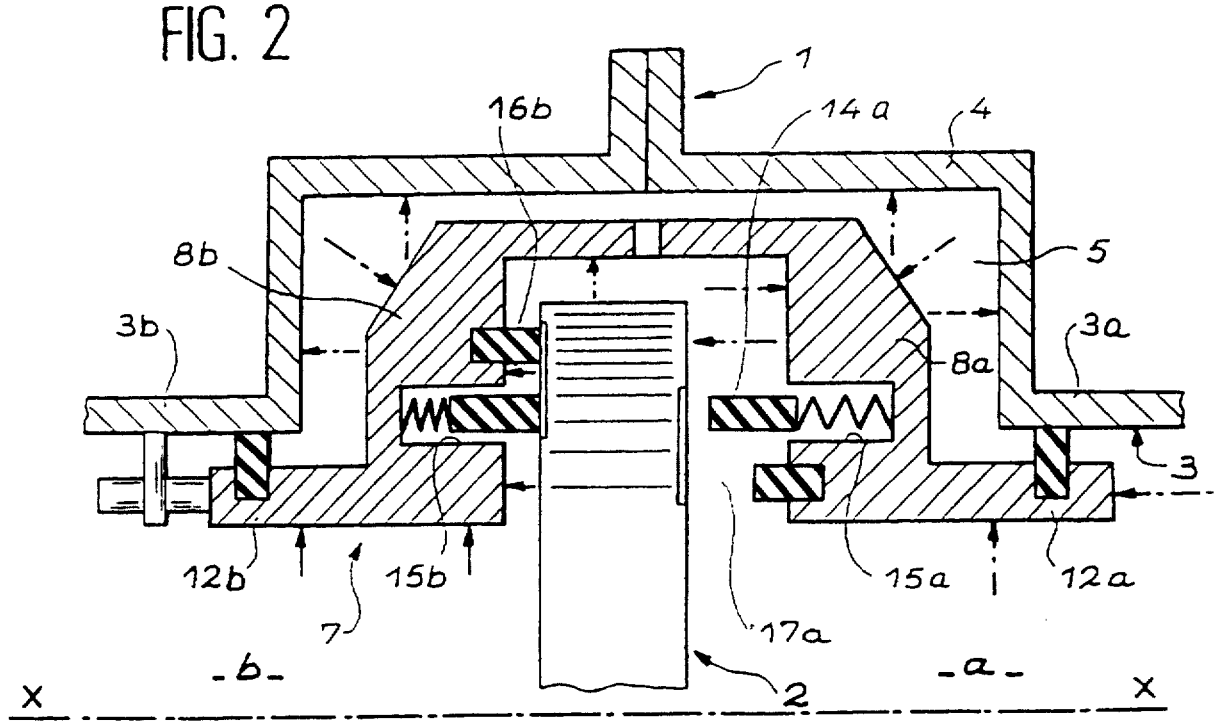

If the position of rotor plate 6 is disturbed in an axial direction, the situation shown in FIG. 2 may arise: rotor plate 6 has moved towards high pressure area b, has pushed back the corresponding elastic joint 14b and has finally come to stop against gasket 16b. In this situation the other elastic joint 14a is detached from stator plate 6 or at least pushes much less strongly against it so that the same quality seal is no longer ensured. The consequence is that peripheral chamber 5 which was previously subjected to an intermediate pressure between low pressure and high pressure, opens under the effect of the low pressure and its pressure eventually becomes absolutely equal to this low pressure. A situation is reached whereby the seal is chiefly ensured by expansion joint 13b and stop gasket 16b on the high pressure side, and elastic joint 14b on the high pressure side has a reduced sealing effect so that it can be considered that the space between it and stop gasket 16b also becomes a high pressure site.

In this situation in which the pressure of peripheral chamber 5 is reduced, an imbalance is perceived due to the eruption of high pressure between joints 14b and 16b. Floating body 7 is subsequently subjected to a resulting pressure force directed towards the high pressures which moves the body to the left just as the rotor plate 6 previously mentioned. This movement of floating body 7 lasts until elastic joints 14a and 14b again exert the same sealing effect and the situation of balance in FIG. 1 is restored, rotor plate 6 and floating body 7 nevertheless having made an identical movement.

A symmetrical situation appears when rotor plate 2 moves towards the low pressure area. In this case it is the stop gasket 16a on the low pressure side which exerts the main sealing effect, and the high pressures will exert on floating body 7 a resultant force directed towards the right exerting itself between elastic joint 14a and stop gasket 16a on the low pressure side. Floating body 7 will then be pushed back towards the right again tending towards the position of balance.

Obviously, numerous modifications and variations of the present invention are possible in light of the above teachings. It is therefore to be understood that within the scope of the appended claims, the invention may be practiced otherwise than as specifically described herein.

The surfaces of rotor plate 6 on which elastic joints 14 and stop gaskets 16 rub are polished to form friction mirrors.

Elastic joints 14 may of known kinds, in particular made up of brush pins.

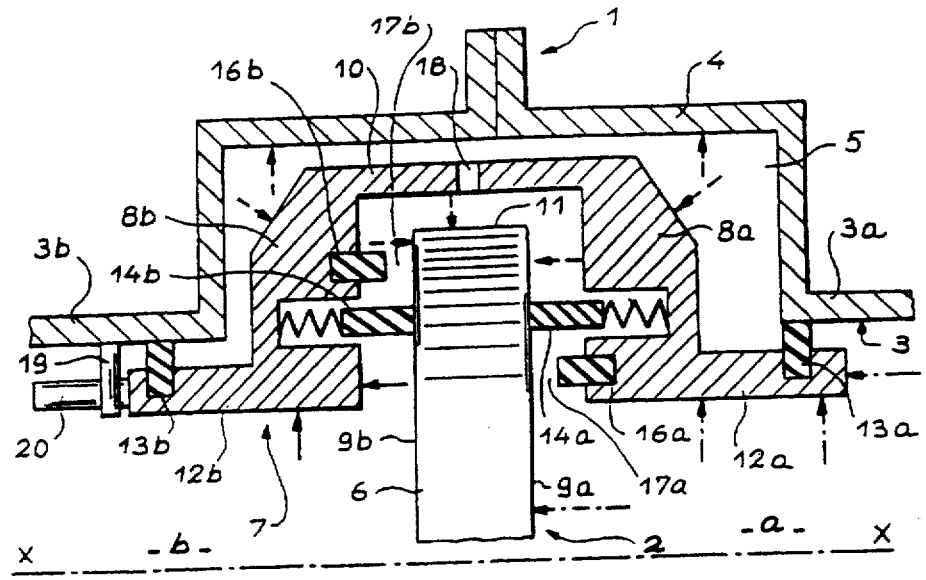

We claim:

1. A sealing unit between a stator and a rotor carrying a plate and rotating about an axis, the plate separating a low pressure sector and a high pressure sector and having first and second sides respectively facing said sectors, the sealing unit comprising:

a floating body stationary with respect to the stator in rotation about the axis but slidable along the stator in a direction of said axis, the floating body comprising first and second end parts coaxial with the stator and first and second flanges respectively facing the first and second sides of the plate, and circular sealing gaskets comprising first and second planar sliding gaskets respectively provided between the end parts and the stator, first and second cylindrical stop gaskets respectively provided between the first and second flanges and the furst and second sides of the plate, a gap respectively located between the first and second flanges, the first and second sides and between the stop gaskets, and first and second cylindrical elastic gaskets respectively provided and compressed between the first and second flanges and the first and second sides of the plate, the first and second elastic gaskets having a lesser sealing efficiency than the first and second sliding gaskets and the first and second stop gaskets and yielding when the plate comes nearer to the first and second flanges, the first stop gaskets surrounding the first elastic gasket in the high pressure sector and the second elastic gasket surrounding the first stop gasket in the low pressure sector.

2. A sealing unit according to claim 1, wherein each of said stop gaskets are mounted on the floating body.

3. A sealing unit according to claim 2, wherein the first and second flanges are connected by a discontinuous section so as to communicate a chamber defined by the stator, the end sliding gaskets and the floating body with a volume defined by the floating body and the plate.

* * * * *

UNITED STATES PATENT AND TRADEMARK OFFICE
CERTIFICATE OF CORRECTION

PATENT NO. : 5,700,011
DATED : December 23, 1997
INVENTOR(S) : BAINACHI et al.

It is certified that error appears in the above-indentified patent and that said Letters Patent is hereby corrected as shown below:

Column 5, line 1, change "first" (both occurrences) to --second--; same line, change "gaskets" to --gasket--;

line 2, change "second" to --first--; and line 6, after "gaskets", insert --, planar sliding gaskets and elastic gaskets--.

The title page, showing the illustrative figure, should be deleted to appear as per the attached title page.

The sheet of drawing, consisting of Figure 1 and 2 should be deleted to appear as per attached sheet.

Signed and Sealed this

Twenty-first Day of July, 1998

*Attest:*

BRUCE LEHMAN

*Attesting Officer*     *Commissioner of Patents and Trademarks*

United States Patent [19]

Bainachi et al.

[11] Patent Number: 5,700,011
[45] Date of Patent: Dec. 23, 1997

[54] SEALING UNIT WITH AXIAL BRUSHES CONTROLLED BY STATIC PRESSURE IN AXIAL MOVEMENT

[75] Inventors: Daniel Olivier Bainachi, Avon; Guy Franck Paul Dusserre-Telmon, Sivry Courtry; Daniel Georges Plona, Vulaines sur Seine, all of France

[73] Assignee: Societe Nationale d'Etude et de Construction de Moteurs d'Aviation "Snecma", Paris, France

[21] Appl. No.: 738,908

[22] Filed: Oct. 28, 1996

[30] Foreign Application Priority Data

Nov. 15, 1995 [FR] France .......................... 95.13507

[51] Int. Cl.⁶ .......................... F16J 15/38
[52] U.S. Cl. .......................... 277/65; 277/83
[58] Field of Search .......................... 277/65, 83, 38, 277/59, 81 R, 85, 91, 95, 82

[56] References Cited

U.S. PATENT DOCUMENTS

| | | | |
|---|---|---|---|
| 3,033,579 | 5/1962 | Seaver | 277/65 |
| 3,260,530 | 7/1966 | Jelatis et al. | 277/65 |
| 4,071,253 | 1/1978 | Heinen et al. | 277/65 |
| 4,434,986 | 3/1984 | Warner | 277/65 |
| 4,669,735 | 6/1987 | Sundberg et al. | |
| 4,813,689 | 3/1989 | Stalter et al. | 277/65 |
| 5,000,463 | 3/1991 | Sun | |
| 5,058,905 | 10/1991 | Nosowicz et al. | 277/65 |
| 5,203,575 | 4/1993 | Azibert et al. | 277/65 |
| 5,490,679 | 2/1996 | Borrino et al. | 277/65 |

FOREIGN PATENT DOCUMENTS 2 167 141   5/1986   United Kingdom.

*Primary Examiner*—Daniel G. DePumpo
*Attorney, Agent, or Firm*—Oblon, Spivak, McClelland, Maier & Neustadt, P.C.

[57] ABSTRACT

Sealing unit made up of a floating body placed between a stator and a rotor, axially mobile along the stator and carrying sealing joints between a high pressure area and a low pressure area separated by the rotor. Another pair of joints and by, by stopping against rotor when the latter is displaced axially, allows a resultant pressure force to be exerted which moves floating body in the same direction as the rotor to reach a position of balance in which the elastic joints operate in satisfactory manner without being subjected to excessive wear and without breaking the seal.

3 Claims, 1 Drawing Sheet